Feb. 27, 1968   A. P. GOLDMAN   3,371,003

PROCESS FOR MAKING SELF-EDGED LAMINATED PANEL

Filed June 8, 1964

INVENTOR.
ABE PAUL GOLDMAN
BY Lyon & Lyon
ATTORNEYS 3,371,003
PROCESS FOR MAKING SELF-EDGED LAMINATED PANEL
Abe Paul Goldman, 641 S. Saltair Ave., Los Angeles, Calif. 90049
Filed June 8, 1964, Ser. No. 373,248
4 Claims. (Cl. 156—267)

ABSTRACT OF THE DISCLOSURE

This patent describes a process of forming a self-edged laminated panel comprising: bonding a decorative sheet impregnated with a thermosetting resin to the surface of a substrate by means of heat and pressure, securing the substrate and bonded sheet to a core by means of adhesive material to form a laminated panel, and subsequently bonding a decorative strip impregnated with a thermosetting resin to an edge of the laminated panel by means of heat and pressure, the strip overlapping an exposed edge of the sheet, the resin penetrating into the core substrate during the latter said bonding step to provide a continuous sealed joint after curing.

---

This invention relates to laminated panels and is particularly directed to an improved form of edge-coating process for such panels.

Decorative laminated panels are conventionally produced by bonding a resin-impregnated decorative sheet to a substrate under heat and pressure, and subsequently mounting the substrate on a plywood or other core by means of a suitable adhesive. The decorative sheet may comprise a white or colored paper or fabric with or without printing, and thin natural wood veneers are also used in some instances. The paper, fabric, or wood veneer is saturated with a polymerizable thermosetting resin solution such as melamine, polyester, diallyl phthalate, phenolic, or the like. The impregnation is usually accomplished in a treater or coater-oven in which the sheet, usually provided in a roll, is first passed through a bath of resin solution and then through an oven capable of evaporating the solvent at a desired rate, and subsequently heating the material so as to accomplish "B-staging" or partially advancing the polymerization of the resin by suitable combinations of temperatures and residence times.

The substrate provides the stiffening or backing and while it is much thicker than the impregnated sheet it is usually thinner than the plywood or other core. In many cases, and particularly where a melamine resin system is used in the decorative sheet, the substrate consists of several sheets of kraft paper which have been impregnated with a phenolic resin and cured under heat and pressure. In many instances and generally where various types of polyester or phenolic resin systems are used in the decorative sheet, various types of hardboard, for example, "Masonite," plywood, particleboard, etc., are used as a substrate. The process of laminating the decorative sheet and the substrate is usually accomplished in a hydraulic or pneumatic press, or in a vacuum bag device and employing temperatures in the range from 250° F., to 350° F. Pressures used range from one atmosphere to as much as 2,000 p.s.i., or more. Time cycles range from a few minutes to as long as one hour, or more.

In this laminating process, a film of cured resin forms over the decorative sheet and acts as a protective coating for the color or pattern. In many instances where the decorative laminate is expected to withstand hard wear or abrasive exposure, an impregnated transparent paper sheet is included in the laminate directly above the impregnated decorative sheet.

When these decorative laminated panels are to be employed in the manufacture of furniture, cabinets, doors, walls, etc., the core may include a relatively thick, rigid body section, such as lumber, plywood, or particleboard, which serves as a backing for the substrate. The core is secured by any suitable adhesives to the substrate or substrates. The core may be positioned between two substrates, each with its bonded decorative sheet on its outer surface. The edges of these relatively thick panel sections usually require some covering or finish to prevent the exposure of the raw and unsightly edge surface. Conventionally this edge coating is accomplished by painting or by some other type of coloring. This conventional method is not satisfactory because the edges of the plywood or particleboard core are rough and porous. Filling and sanding of these edges to obtain a satisfactory painting surface is time-consuming and costly. Other conventional methods are used, such as edge-banding the core with lumber strips prior to the application of the decorative laminate, but these methods are also complex and costly. Even when a good edge surface is established, the painting of the edges is generally unsatisfactory because of problems of matching and quality of the painted surface.

Another conventional process of providing an edge coating for a panel of this type consists in applying strips of the same or similar finished decorative laminate to the panel edges by means of adhesives. While this process has heretofore provided a fairly satisfactory edge treatment, it nevertheless requires costly handwork and is frequently unreliable. It leaves the edges of the decorative laminate itself exposed, exhibiting an unsightly brown or black line at the corner joint along the edge. Furthermore, the edge configurations which are possible or practical with this method are generally limited to square or angular edges.

The principal object of this invention is to eliminate the undesirable features of the conventional processes described above, and to provide a new process in which the edge covering for the panel is produced by bonding a strip impregnated with a polymerizable thermosetting resin to the edge surface of the panel, after the decorative sheet has been bonded to the substrate(s), and after the substrate(s) have been secured to the core by an adhesive, thereby providing a superior joint at the junction corner between the surface sheet(s) and the edge strip. The resin systems for the edge coating need not be the same as the resin system for the surface coating. The new process also enables superior edge coatings to be applied to panel edges which are curved in cross section.

Other and more detailed objects and advantages will appear hereinafter.

Figure 1:
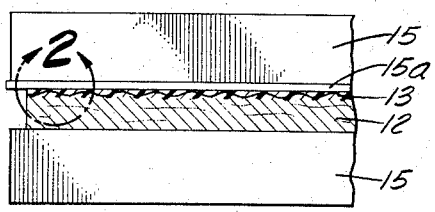
FIGURE 1 is a sectional view in schematic form showing a decorative laminated panel being formed under heat and pressure in the conventional manner, the thickness of the resin-impregnated surface sheets on the top and bottom of the laminated panel being exaggerated for purposes of illustration.
Figure 2:
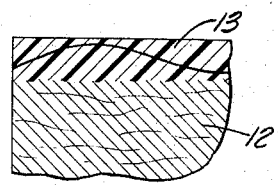
FIGURE 2 is a fragmentary sectional view showing an enlargement of a portion of FIGURE 1, as indicated on FIGURE 1.

Referring to the drawings, the laminated panel generally designated 10 comprises a central core or body 11 of plywood, hardboard, or the like, the substrates 12, and the surface coating comprising the resin-impregnated decorative sheets 13. The core 11 is fixed to the substrates 12 by a pressure-sensitive adhesive 14. The lamination of the substrates and decorative sheets 13 prior to attachment to the core is accomplished in conventional apparatus which may include heated dies 15, and in the lamination process the polymerizable resin in the sheets 13 is fully cured to provide the desired protective surface coating. A metal press plate or caul, or a release film 15a of polyester, Teflon, etc., may be employed between the die and the work, in the usual way. This acts as a strip sheet as well as to provide the desired surface finish. The cured substrates are then secured by adhesive 14 to the central core 11 to form the laminated panel 10.

Figure 3:
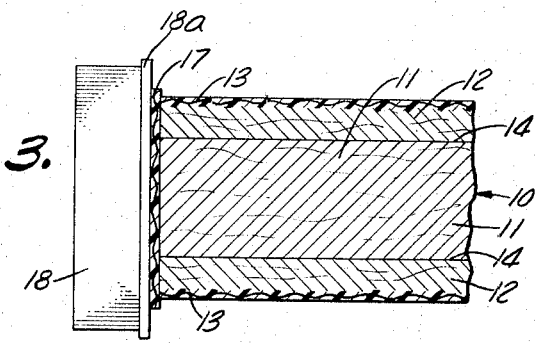
FIGURE 3 is a schematic sectional view showing the laminated panel of FIGURE 1, and showing a decorative edge strip in position along one edge of the panel. The edge strip overlaps the top and bottom decorative sheets of the panel, and a heated die is in pressure contact with the edge strip.
Figure 4:
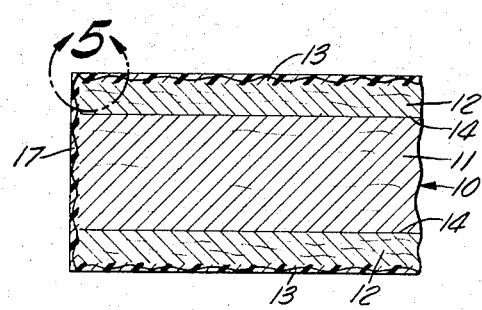
FIGURE 4 is a sectional view of the completed self-edged laminated panel.
Figure 5:
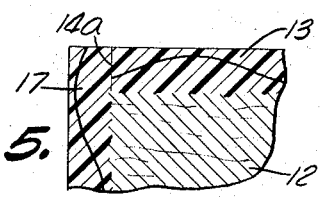
FIGURE 5 is a fragmentary sectional view showing an enlargement of a portion of FIGURE 4, and showing the improved corner joint.

The edges of the panel 10 are trimmed and a polymerizable resin-impregnated decorative edge strip 17 is placed in position along an exposed edge of the laminated panel 10 with edges of the strip 17 overlapping edges of the decorative sheets 13, as shown in FIGURE 3. One or more impregnated paper sheets may be employed in this strip 17. No special preparation of the edge surface of the panel 10 is required other than a normally good machined surface obtained in shaping or sawing. Briefly stated, the edge coating is applied in the same general manner as the surface coating, described above, although the resin system need not be the same. A heated pressure-applying die 18, shown diagrammatically in FIGURE 3, is placed in contact with the edge strip 17. A metal press plate or caul, or a release film 18a of polyester, Teflon, etc., may be employed between the die 18 and the work, as before. Bonding and curing of this edge strip 17 is accomplished under heat and pressure. There is thus produced a matching or blending treatment which covers the rough and porous edge of the panel 10. The edge strip 17 extends over and covers and bonds to the core 11 and substrates 12, 12, and the resin of the strip 17 flows sufficiently under pressure and before curing to fill any crack between the strip 17 and the cured resin of the sheets 13, so that the corner joint line 14a is minimized or completely disappears. Although the edge strip 17 may not actually form a full integral bond with the surface sheet 13, some adherence of the resin of the strip 17 is achieved with the cured resin of the sheet 13 so that the completed joint gives the appearance of a continuous integrally sealed corner bond, and the objectionable brown or black joinder lines of prior-art corner joints are eliminated.

The penetration of the resin during each bonding step is such that there is no sharp line of demarcation between the sheet 13 or strip 17 and the substrate or core.

In a particular example, the decorative sheets 13 comprised printed paper which was colored and impregnated with a polymerizable thermosetting polyester resin system. The saturating paper was produced by Hurlbut Paper Company, South Lee, Massachusetts, No. 442–MY. The paper was then impregnated with a resin solution to approximately 55 percent resin content. The resin solution consisted of 90 parts by weight of Polylite No. 32–504, furnished by Reichhold Chemicals, Incorporated, New York City; 10 parts by weight of diallyl phthalate monomer, furnished by Food Machinery and Chemical Corporation, New York City; two parts by weight of tertiary butyl perbenzoate, furnished by Wallace and Tiernan, Buffalo, New York; and 50 parts by weight of acetone.

The resin-impregnated paper was then passed through an oven drier device for seven minutes at 280° F.

Bonding and curing takes place in a hydraulic press at a temperature of 300° F. and at a pressure of 200 p.s.i. for a time period of 15 minutes. For this particular resin system, the temperature may range from 275° F. to 325° F., the pressure may vary from 100 p.s.i. to 300 p.s.i., and the time interval may extend from ten to twenty minutes. No subsequent cooling cycle under pressure is required.

After curing, the projecting lip or flash at the corner is then removed, preferably by a high-speed rotary knife.

Figure 6:
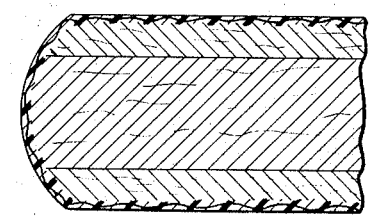
FIGURE 6 is a schematic sectional view showing a modification having a curved convex edge.
Figure 7:
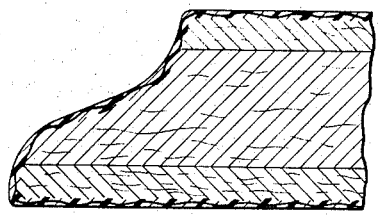
FIGURE 7 is a schematic sectional view showing a further modification having a double curved edge.

This process is applicable to a relatively unlimited range of edge configurations. FIGURES 6 and 7 show modified types of edge configurations which are readily produced by means of this process. Moreover, the costs of producing self-edged laminated panels according to this process is substantially lower than previous conventional methods, and it is particularly well suited to high-volume automated production.

Having fully described my invention, it is to be understood that I do not wish to be limited to the details herein set forth, but that my invention is of the full scope of the appended claims.

I claim:

1. The process of forming a self-edged laminated panel, comprising: bonding a decorative sheet impregnated with a thermosetting resin to the surface of a substrate by means of heat and pressure, securing the substrate and bonded sheet to a core by means of adhesive material to form a laminated panel, and subsequently bonding a decorative strip impregnated with a thermosetting resin to an edge of the laminated panel by means of heat and pressure, the strip overlapping an exposed edge of the sheet, the resin penetrating into the core and substrate during the latter said bonding step to provide a continuous sealed joint after curing.

2. The process of forming a self-edged laminated panel, comprising: bonding a decorative sheet impregnated with a thermosetting resin to the surface of a substrate by means of heat and pressure, securing the substrate and bonded sheet to a core by means of adhesive material to form a laminated panel, and subsequently bonding a decorative strip impregnated with a thermosetting resin to an edge of the laminated panel under heat and pressure, the strip overlapping an exposed edge of the sheet, the resin penetrating into the core and substrate during the latter said bonding step to provide a continuous sealed joint after curing, and then trimming away the overlapping portion of the strip.

3. The process of forming a self-edged laminated panel having edges curved in cross section, comprising: bonding a decorative sheet impregnated with a thermosetting resin to the surface of a substrate by means of heat and pressure, securing the substrate and bonded sheet to a core by means of adhesive material to form a laminated panel, the panel having an edge surface curved in cross section, and subsequently bonding a decorative strip impregnated with a thermosetting resin to the curved edge of the panel under heat and pressure, the strip overlapping an exposed edge of the sheet, the resin penetrating into the core and substrate during the latter said bonding step to provide a continuous sealed joint after curing.

4. The process of forming a self-edged laminated panel, comprising: bonding top and bottom decorative sheets each impregnated with a thermosetting resin to top and bottom surfaces of a pair of substrates by means of heat and pressure, securing a core between the substrates by means of adhesive material to form a laminated panel, and subsequently bonding a decorative strip impregnated with a thermosetting resin to an edge of the laminated panel by means of heat and pressure, the strip overlapping exposed edges of the sheets, the resin penetrating into the core and substrates during the latter said bonding step to provide a continuous sealed joint after curing.

(References on following page)

References Cited

UNITED STATES PATENTS

| | | | |
|---|---|---|---|
| 1,597,539 | 8/1926 | Novotny et al. | 161—258 |
| 2,694,028 | 11/1954 | Rapp | 161—165 |
| 2,748,046 | 5/1956 | Works et al. | 156—64 |
| 2,801,198 | 7/1957 | Morris et al. | 161—246 |
| 3,018,206 | 1/1962 | Hood et al. | 161—205 |

EARL M. BERGERT, *Primary Examiner.*

HAROLD ANSHER, *Examiner.*